G. C. CORNELL.
CRANK DEVICE FOR INTERNAL COMBUSTION ENGINES.
APPLICATION FILED JULY 1, 1911.

1,037,133.

Patented Aug. 27, 1912.

2 SHEETS—SHEET 1.

Witnesses
J. H. Crawford
C. Edwardslough

Inventor
George C. Cornell,
By Victor J. Evans
Attorney

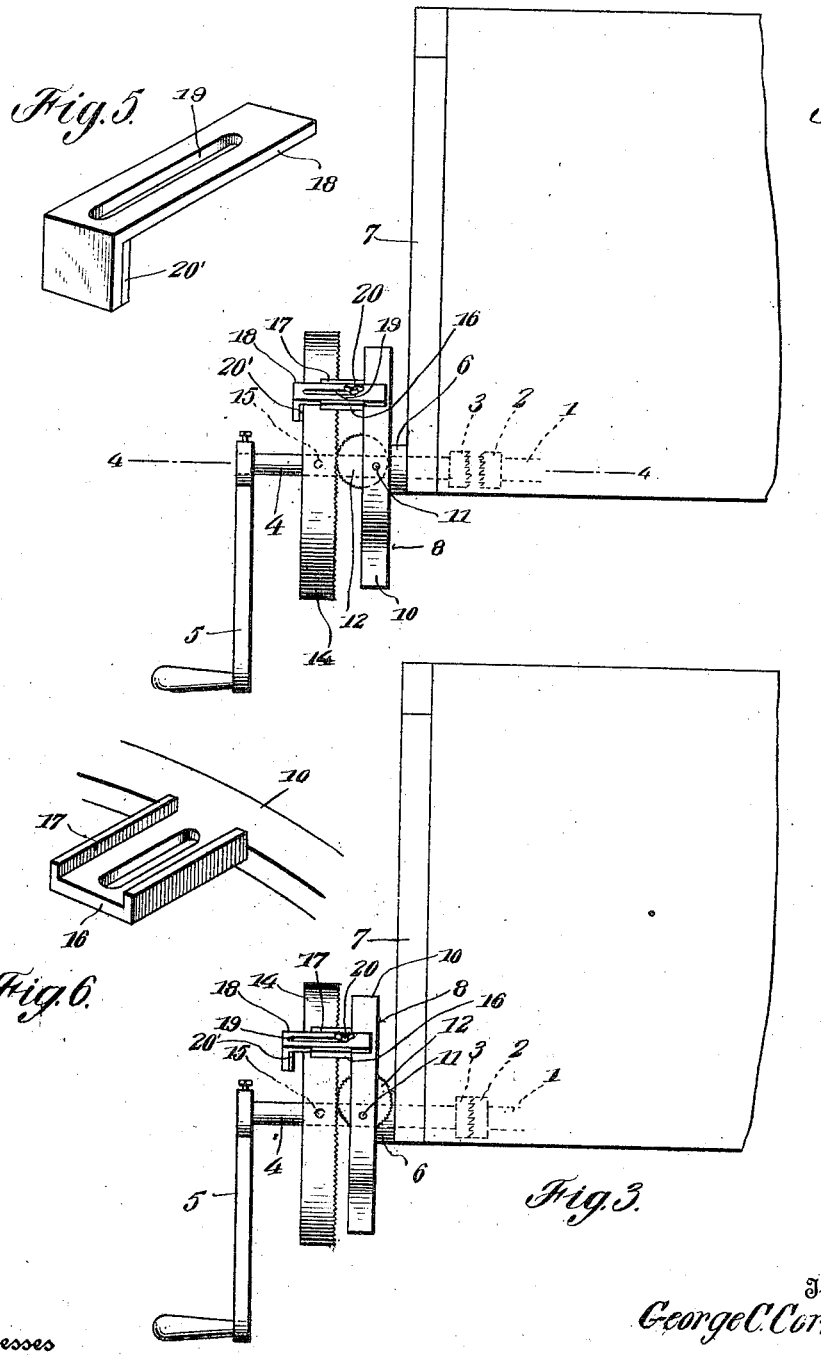

UNITED STATES PATENT OFFICE.

GEORGE C. CORNELL, OF CANTON, PENNSYLVANIA.

CRANK DEVICE FOR INTERNAL-COMBUSTION ENGINES.

1,037,133.  Specification of Letters Patent.  Patented Aug. 27, 1912.

Application filed July 1, 1911. Serial No. 636,327.

*To all whom it may concern:*

Be it known that I, GEORGE C. CORNELL, a citizen of the United States, residing at Canton, in the county of Bradford and State of Pennsylvania, have invented new and useful Improvements in Crank Devices for Internal-Combustion Engines, of which the following is a specification.

This invention relates to engine attachments and more particularly to cranking attachments for internal combustion engines.

The object of the invention is the provision of a simple, efficient and cheaply constructed device which may be readily attached to any type of internal combustion engine, so as to prevent accidents resulting from back firing.

A further object of the invention is the provision of an attachment of this character which obviates the use of the usual clutch disconnecting spring and which embodies a brake adapted to control the revolution of the clutch shaft when the engine back fires, so that the impetus given said clutch shaft will be immediately stopped.

Further objects of the invention will appear as the following specific description is read in connection with the accompanying drawings, which form a part of this application, and in which:—

Figure 4:
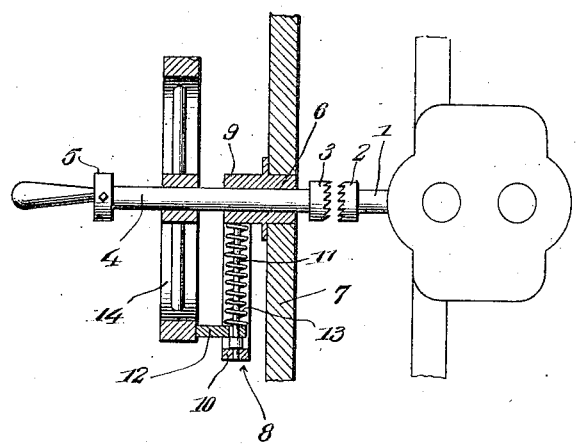
Figure 1:
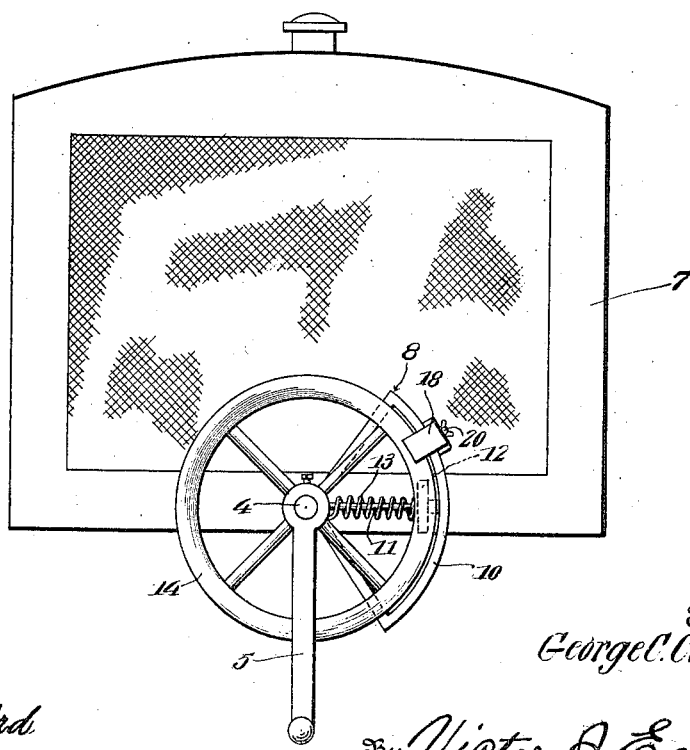

Figure 1 is a front elevation of the device shown applied to an automobile. Fig. 2 is a side elevation of the same showing a portion of the automobile in section and showing the parts in normal position. Fig. 3 is a similar view showing the parts in operative cranking position. Fig. 4 is a horizontal section taken on the line 4—4 of Fig. 2. Fig. 5 is a perspective view of the brake arm. Fig. 6 is a fragmentary perspective view of a portion of a segment and the brake arm bracket carried thereby.

Referring more particularly to the drawings, 1 represents an ordinary engine shaft having a clutch element 2 mounted upon its outer end and adapted to engage a similar clutch element 3 carried upon the crank shaft 4 which is provided, as is usual, with the crank 5, the shaft being journaled in a bearing 6 carried upon the radiator frame 7.

The attachment comprises a segment 8 having a hub 9 to surround the shaft 4. This hub is held rigid with the bearing 6 in any suitable manner and preferably is constructed so as to be adjustable upon the bearing to provide for engines cranking in opposite directions, as will be understood. The segment 8 has journaled in its rim 10 and in its hub 9 a radially extending shaft 11 having keyed thereto an eccentric 12 which may be of any suitable formation found most desirable in practice. This eccentric is operated and the shaft turned in one direction by a spiral spring 13 which surrounds the shaft 11 and has its respective ends connected to the hub 9 and to the cam 12 so as to throw the latter outwardly beyond the side of the segment 8.

Lying within the path of the eccentric and adapted to be engaged thereby is a wheel 14 which is adjustably keyed to the shaft 4 by means of a set screw 15, so that when the operator releases his hold or pressure upon the crank the spring 13, acting through the eccentric and wheel 14, will force the shaft 4 outwardly through the bearing 6 and disconnect the clutch member 3 from its associate 2 upon the shaft 1.

Projected outwardly from the segment 8 is a slotted bracket 16 having flanged sides 17 between which the long end of a right angular brake arm 18 is mounted. This long arm is also slotted, as shown at 19, so as to receive a set screw 20 which holds the arm in adjusted position upon the bracket, the flanges 17 preventing sidewise movement of the arm, as will be understood. The short leg of the arm 18 is preferably fitted with a shoe 20' of some friction material which will also cushion the impact of the wheel 14. This short leg overhangs the wheel as shown and when the latter is thrown out by the action of the eccentric, as will hereinafter be described, engages the wheel and retards or stops its rotation. The movement of the wheel is regulated by the arm 18, so as to accommodate the depth of the teeth in the clutch members 2 and 3. The face of the eccentric and the inner side of the wheel 14 are preferably milled, so as to insure proper coaction between these parts.

In the operation of the device the operator grasps the crank 5 and rotates the shaft 4 in the direction of the arrow, shown in Fig. 1, at the same time forcing the shaft inwardly so as to engage the clutch member 3 with its associate 2 on the engine shaft 1. Should a back fire occur when the clutch members are in engagement with each other and the parts arranged as shown in Fig. 3, the wheel 14 rotating in the opposite direction from that shown by the arrow in Fig. 1 and being in engagement with the eccentric will cause the eccentric to be thrown outwardly, thus moving the wheel 14 away from the segment and the clutch member 3 away from the clutch member 2. This action may be accomplished very rapidly. When the clutch members 2 and 3 have been disengaged, as above described; at this time the shoe 20' will engage wheel 14 and retard its movement. By adjusting the arm 18 the throw of the shaft 4 may be properly regulated to accommodate the device to machines having clutches with different depths of teeth. The size and shape of the eccentric may also be changed to suit circumstances and the tension of the spring 13 reversed, if necessary, to accommodate the device to oppositely cranking machines.

Having thus described the invention, what I claim as new is:—

1. The combination with an engine shaft and a cranking shaft adapted to engage and operate the same, of a circular member adjustably secured to the cranking shaft a stationary mounting, an eccentric journaled at right angles to the axis of the circular member in said stationary mounting, means normally tending to throw the eccentric to operative position, whereby the circular member and the cranking shaft are thrown away from the engine shaft, and means for limiting the relative separation of the circular member and engine shaft and for retarding the movement of the circular member in one direction.

2. The combination with an engine shaft and a cranking shaft therefor mounted to slide toward and away from said engine shaft, of interchanging clutch members on said shafts, a circular member carried by the cranking shaft, a stationary mounting, a spring operated eccentric carried by the mounting and normally engaging the circular member and holding the clutch upon the cranking shaft out of engagement with the clutch member on the engine shaft, and an adjustable braking device adapted to engage the circular member to retard its rotation when operated in a reverse direction from the normal rotation of the engine shaft.

In testimony whereof I affix my signature in presence of two witnesses.

GEORGE C. CORNELL.

Witnesses:
E. EDMONSTON, Jr.,
L. E. WALTERS.

Copies of this patent may be obtained for five cents each, by addressing the "Commissioner of Patents, Washington, D. C."